May 19, 1959
L. R. RIGGEN
2,887,680
BACKLASH DETECTOR APPARATUS
Filed May 15, 1956
2 Sheets-Sheet 1
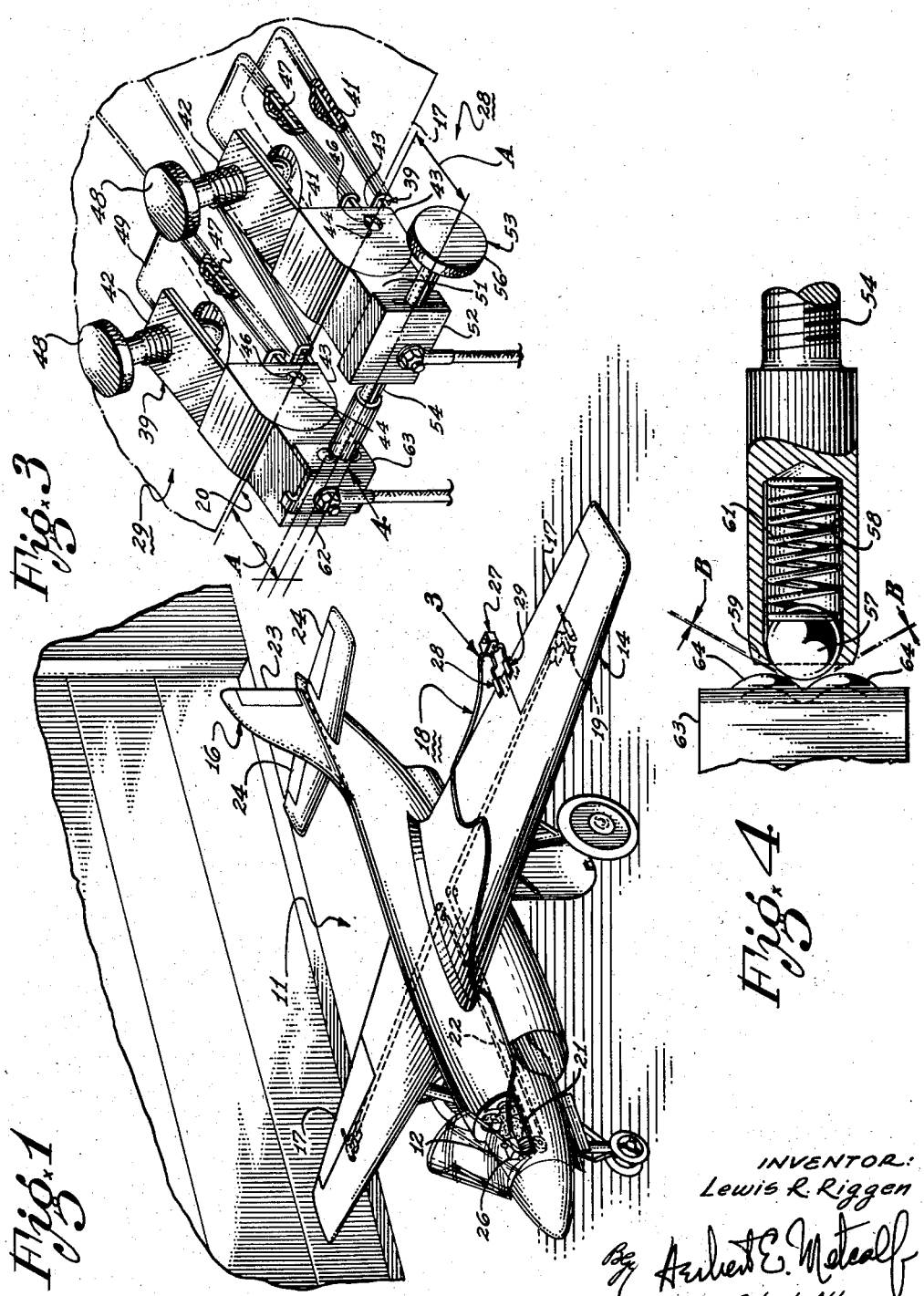
INVENTOR:
Lewis R. Riggen
By Herbert E. Metcalf
His Patent Attorney May 19, 1959  L. R. RIGGEN  2,887,680
BACKLASH DETECTOR APPARATUS
Filed May 15, 1956  2 Sheets-Sheet 2
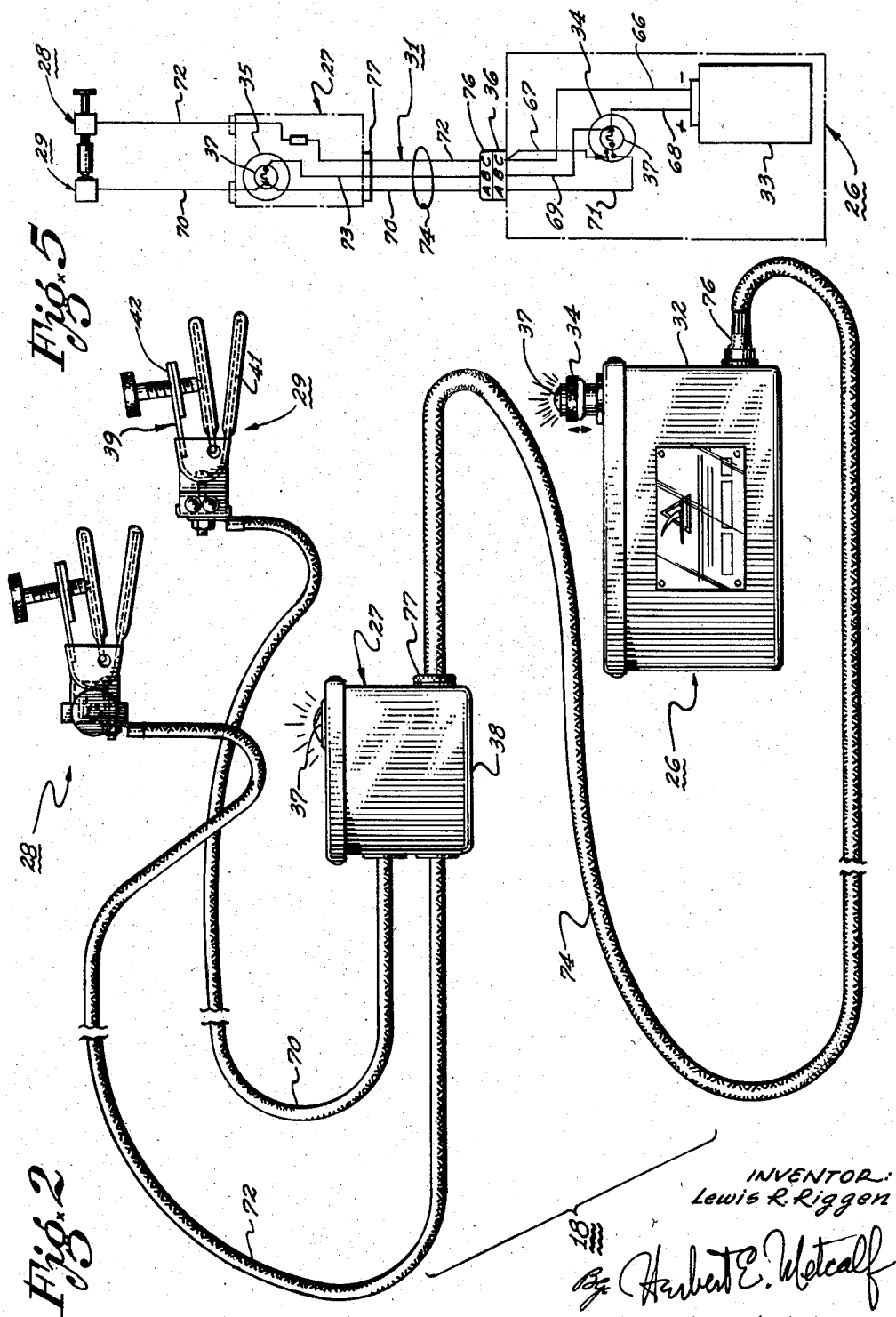
INVENTOR:
Lewis R. Riggen
By Herbert E. Metcalf
His Patent Attorney United States Patent Office 2,887,680
Patented May 19, 1959

2,887,680

BACKLASH DETECTOR APPARATUS

Lewis R. Riggen, Phoenix, Ariz., assignor to Northrop Aircraft, Inc., Hawthorne, Calif., a corporation of California Application May 15, 1956, Serial No. 584,999

6 Claims. (Cl. 340—282)

This invention relates to backlash detecting apparatus and more particularly to apparatus for detecting the degree of backlash present in aircraft attitude controls surface installations and operating control therefor.

Frequently the attitude control surfaces of an aircraft and operating controls therefor embody, or in the opinion of the pilot of an aircraft, they seem to embody an excessive amount of backlash. In reaching his decision the pilot may be entirely correct, however, on the other hand the feeling of apparent backlash may be due to prevailing conditions other than backlash. Accordingly it is the responsibility of a maintenance mechanic or technician to check the degree of backlash present in the various aircraft control surface installations and operating controls to determine if these installations are within the tolerance as specified by the manufacturer and/or company operating the aircraft. Apparatus utilized in the execution of the above operations should be characterized in that it facilitates an accurate and speedy operation.

Accordingly it is an object of the present invention to provide apparatus for accurately and quickly detecting backlash in aircraft attitude control surface installations and operating controls therefor.

Another object is to provide apparatus for detecting backlash in aircraft attitude control surface installations and operating controls therefor and which may be releasably secured on the aircraft at a plurality of positions to check backlash in the various control surface installations of the aircraft.

Another object is to provide apparatus for checking backlash in aircraft attitude control surface installations and operating controls therefor which is simple in design and construction and which is readily adapted for use in connection with control surfaces having various angular relations with respect to fixed aircraft structure.

These and other objects and advantages will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

In the drawings:

Figure 1 is a perspective view of an aircraft in which backlash detecting apparatus as disclosed herein is being utilized to determine the degree of backlash present in an aileron installation and operating controls therefor.

Figure 2 is a detail view of the backlash detecting apparatus shown in Figure 1.

Figure 3 is a detailed view of the clamp assemblies of the backlash detecting apparatus viewed as indicated by the arrow 3 of Figure 1.

Figure 4 is an elevational detailed view of the outer end portion of the electrical contact member of Figure 3 viewed as indicated by the arrow 4, portions thereof having been broken away to better show its construction.

Figure 5 is an electrical wiring diagram for the backlash detecting apparatus of Figure 2.

Referring now to the drawings, Figure 1 shows an airplane 11 having a cockpit 12 and including wing and empennage assemblies 14 and 16, respectively. An aileron 17 is provided on each of the wings comprising the assembly 14 and mounted in part on the left hand wing is backlash apparatus 18 of the type disclosed herein. The left-hand aileron is actuated throughout its operating range by a hydraulic servo mechanism 19 which is responsive to movements of a control member 21 and which are transmitted to the servo mechanism by a cable system 22. The empennage assembly 16 includes rudder and elevator surface members 23 and 24, respectively.

The backlash detecting apparatus 18, as best seen in Figures 2, 3 and 5, includes a pair of indicating assemblies 26 and 27 and a pair of clamp assemblies 28 and 29 connected in an electrical circuit 31 in a manner to be described presently.

The assembly 26 includes a carrying case 32 in which a battery 33, a depressable switch type light assembly 34, and an electrical receptacle 36 are mounted. The assembly 34 includes an incandescent lamp 37 which becomes illuminated at such times as electric current is flowing through the circuit 31. Likewise, the assembly 27 includes a carrying case 38 in which an incandescent lamp 37 is mounted and which is also illuminated at such times as electrical current is flowing through the circuit 31.

The backlash detecting apparatus 18 also includes the aforementioned clamp assemblies 28 and 29 which are of similar construction in many respects. Accordingly a description of the components which are common to both clamp assemblies follows.

The clamp assemblies 28 and 29 include respective U-shaped members 39 (Figure 3) having a rectangular shaped lower jaw 41, hereinafter referred to as a primary jaw, and an upper screw receiving portion 42. The respective jaws 41 and portions 42 are retained in fixed angular relation by means of side plates 43 secured to the closed ends of the members 39 as by brazing or the like. Aligned circular apertures 44 are provided in the plates 43 and receive trunnion like bearing supports 46 provided on an end of a complimentary or secondary jaw 47 which is also of rectangular configuration. The shank of a manual adjusting screw 48 passes through a threaded aperture formed in the portion 42 of the U-shaped member 39 and contacts the upper surface of the secondary jaw 47. Rubber or plastic sleeves 49 cover the free ends of the jaws 41 and 47 which have a complementary relationship.

In view of the foregoing it will be obvious that the trailing tapered edges of fixed structure, ailerons, elevators etc. may be received between the jaws 41 and 47. The clamps 28 and 29 are retained in position on the aforementioned aircraft members by proper adjustment of the screws 48. It will be noted that the trunnion bearings 46 are considerably less in diameter than the apertures 44. This construction and relation allows the jaws 47 to adjust themselves with respect to the jaws 41 and with respect to tapered members having different angularity.

An insulating and a rectangular block 51 and 52, respectively, are secured to the closed end of the member 39 of the clamp assembly 28 by means of screws or the like (not shown). The block 52 is constructed of electrical conducting material and carries a rod like contact member 53 also constructed of electrical conducting material.

The contact member 53 includes a threaded shank 54 carrying a knurled knob 56 at one end and a spring urged ball 57 at the other. The end of the shank 54 containing the ball 57 is enlarged and suitably drilled as indicated to provide a bore 58 for receiving the ball 57. The outer end of the enlarged portion of the shank 54 is peened over as indicated at 59 (Figure 4) to retain the ball 57 in the bore 58 and is urged against the peened portion by a coiled spring 61. The shank 54 passes through a threaded bore in the block 52 at a distance A aft of the center of the apertures 44. The longitudinal axis of the member 53 and a line 20 containing the centers of the aligned apertures 44 are parallel and are also normal to the side edges of the jaws 41 and 47.

An insulating block 62, similar to the block 51 of the assembly 28, is attached to the end of the member 39 of the clamp assembly 29. Secured to an aft corner of the block 62 is an L-shaped bracket 63 which is also constructed of electrical conducting material. A pair of partial spherical aligned embossments 64 are formed in the side of the bracket 63 which is positioned along the side of the block 62. The bracket 63 is positioned on the block 62 so that, with the clamps 28 and 29 mounted as shown in Figure 3, the embossments 64 are in abutting relation with respect to the ball 57 of the member 53. Further the axes of the embossments 64, which are normal to the vertical sides of the block 62 when the latter is in position on the U-shaped member 39, are also located a distance A aft of the centers of the apertures 44 formed in the side plates of the clamp assembly 29.

In view of the above discussion it will now be apparent that with the assemblies 28 and 29 in their operational positions on the ailerons 17 and fixed structure of the wing assembly 14 the ball 57 and embossments 64 are in aligned relation. With the assemblies 28 and 29 in their operational positions the member 53 is moved, by means of the knob 56, until the ball 57 is in adjacent juxtaposed relation with respect to the embossments 64 but spaced a few thousandths of an inch therefrom as indicated at B (Figure 4). If for any reason the ailerons 17 is moved through an appreciable angle the ball 57 will be deposed in the bore 58 by one of the embossments 64 without damage to member 53.

The components of the detecting apparatus including the battery 33, light assemblies 34 and 35, and clamp assemblies 28 and 29, are integrated in the aforementioned electrical circuit 31 by means of electrical connectors 66 to 73 inclusive, and plug 76. Portions of the connectors 70, 72, and 73, extending between the assemblies 26 and 27, are combined to provide a unitary cable indicated by the numeral 74. Portions of the connectors 70 and 72, extending between the clamp assemblies 28 and 29 and the indicating assembly 27, exit from the latter via gromets and are attached to the clamp assemblies by studs and nuts or the like substantially as shown in Figure 3.

By referring to Figure 5 it will be noted that the lamps 37 may be checked prior to each operation of the apparatus 18. By depressing the movable portion of the light assembly 34 current will flow from the battery 33 via a first circuit including connectors 66, 67, assembly 34, and connector 68 and via a second circuit including connectors 66, 67, 71, 70, light assembly 35, and connectors 73, 69, and 68. The above operation will cause the lamps 37 to become illuminated if they are not damaged. Further, at such times as the ball 57 is in electrical contact with either of the embossments 64, both of the lamps 37 will be illuminated simultaneously by closed electrical circuits which will be apparent by referring to Figure 5.

The various components of the backlash detecting apparatus having thus been described a better understanding of the apparatus will be forthcoming from the following description of its operation.

For example, the clamp assemblies 28 and 29 are attached in adjacent relation on fixed structure of the wing assembly 14 and the trailing edge of the aileron 17, respectively. Thus mounted and with the aileron 17 in its neutral position the ball 57 and embossments 64 are in abutting aligned relationship with the horizontal axis of the ball located midway between the embossments. As seen in Figure 1 the indicating assembly 27 is positioned adjacent the aileron 17 while the assembly 26 is located in the cockpit 22 where it may be observed by the pilot or a technician stationed in the cockpit.

The contact member 53 is now moved by means of the knob 56 toward the embossments 64 until contact therebetween is made as evidenced by the lamps 37 becoming illuminated. The member 53 is now backed off from the embossments until such time as the lamp 37 is no longer illuminated. This operation will automatically determine the distance B (Figure 4) and under these conditions current will cease to flow through the circuit 31. The pilot or technician may now move the control member 21, for example, to the right until contact is again made between the ball 57 and the uppermost embossment 64 at which time both of the lamps 37 will be simultaneously illuminated. At this time the angular distance the control member 21 has moved from its initial position (corresponding to the neutral position of the aileron 17) is noted. This angular distance constitutes a measurement of the degree of back-lash present in the aileron installation including the control member 21, cable system 22, and hydraulic servo 19. In a similar manner the degree of backlash present in the right hand aileron installation may also be determined.

From the foregoing it will be obvious that the backlash detecting apparatus may also be utilized to determine the degree of backlash in the elevator and rudder installations 24 and 23, respectively.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Backlash apparatus for detecting lost motion in an aircraft attitude control member and control apparatus therefor comprising: first and second clamp assemblies each including primary and secondary rectangular shaped jaws of identical construction having fore and aft end portions; said secondary jaws being mounted respectively on said first and second clamp assemblies for pivotal movement about a reference axis adjacent the aft end of respective primary jaws; electrical conducting embossments on said first clamp assembly at a predetermined distance aft of said reference axis; unitary electrical conducting means on said second clamp assembly at a distance aft of said reference axis equal to said predetermined distance; electrical indicating means responsive to current flow therethrough; and means including said embossments and said unitary and indicating means adapted to defining an electric circuit at such times as said unitary means and embossments are in contacting relation.

2. Apparatus as set forth in claim 1: further characterized in that said embossments constitute a pair of spaced aligned embossments each defining a partial spherical surface and said unitary means includes a rod member one end of which terminates in a partial spherical surface.

3. Apparatus as set forth in claim 2: in which the common axis of said aligned embossments is normal to said reference axis and said end of said rod member constitutes a ball resiliently mounted thereon and is urged in a direction away from said rod member.

4. In an aircraft including an attitude control member mounted thereon for angular movement between a neutral and a plurality of non-neutral positions in response to control apparatus also mounted in said aircraft, a backlash detector comprising: a first assembly mounted on said attitude member for movement therewith and including unitary electrical conducting means; a second assembly mounted on fixed structure of said aircraft adjacent said attitude control member and including spaced electrical conducting means; and unitary and spaced means having a spaced juxtaposed relation at such times as said first and second assemblies are mounted on said control member and fixed structure, respectively, and said control member is in said neutral position and a contacting relation at such as said control member is moved a predetermined angular amount from said neutral position; indicating means energized in response to current flow therethrough; and means including said unitary, spaced, and indicating means defining an electric circuit adapted to energize said indicating means at such times as said control member is moved a predetermined angular amount from said neutral position.

5. Apparatus as set forth in claim 4: further characterized in that said spaced means constitutes a pair of partial spherical aligned embossments and said unitary means includes an elongated member one end of which constitutes a partial spherical surface.

6. Apparatus as set forth in claim 5: further characterized in that said one end of said elongated member constitutes a ball resiliently mounted thereon and urged in a direction away from said elongated member and portions of said ball being located between said embossments at such time as said first and second assemblies are mounted on said control member and fixed structure, respectively, and said control member is in said neutral position.

References Cited in the file of this patent

UNITED STATES PATENTS

| | | |
|---|---|---|
| 2,395,393 | Brilliantine | Feb. 26, 1946 |
| 2,433,743 | Dickens | Dec. 30, 1947 |